United States Patent
Kwon

(10) Patent No.: US 12,223,033 B2
(45) Date of Patent: Feb. 11, 2025

(54) METHOD FOR PROVIDING REMOTE SERVICE CAPABLE OF MULTILINGUAL INPUT AND SERVER PERFORMING THE SAME

(71) Applicant: ERmind Co., Ltd., Seoul (KR)

(72) Inventor: Young Min Kwon, Seoul (KR)

(73) Assignee: ERmind Co., Ltd., Seoul (KR)

(*) Notice: Subject to any disclaimer, the term of this patent is extended or adjusted under 35 U.S.C. 154(b) by 357 days.

(21) Appl. No.: 17/382,181

(22) Filed: Jul. 21, 2021

(65) Prior Publication Data
US 2022/0309151 A1  Sep. 29, 2022

(30) Foreign Application Priority Data

Mar. 25, 2021 (KR) .................. 10-2021-0039119
May 12, 2021 (KR) .................. 10-2021-0061603

(51) Int. Cl.
*G06F 21/53* (2013.01)
*G06F 16/955* (2019.01)

(52) U.S. Cl.
CPC .......... *G06F 21/53* (2013.01); *G06F 16/9558* (2019.01); *G06F 2221/2119* (2013.01)

(58) Field of Classification Search
CPC .............. G06F 21/53; G06F 16/9558; G06F 2221/2119; G06F 726/022
See application file for complete search history.

(56) References Cited

U.S. PATENT DOCUMENTS

| | | | |
|---|---|---|---|
| 8,079,087 B1* | 12/2011 | Spies | G06F 16/954 709/225 |
| 9,461,819 B2* | 10/2016 | Nakae | G06F 21/53 |
| 2008/0263650 A1* | 10/2008 | Kerschbaum | G06F 21/6218 726/9 |
| 2015/0222692 A1* | 8/2015 | Jenkins | G06F 21/50 709/203 |
| 2016/0154539 A1* | 6/2016 | Buddhiraja | G06F 9/45558 715/738 |
| 2021/0021638 A1* | 1/2021 | Lancioni | H04L 63/1483 |
| 2022/0174092 A1* | 6/2022 | Farjon | H04L 63/123 |

FOREIGN PATENT DOCUMENTS

| | | |
|---|---|---|
| KR | 10-2014-0144636 A | 12/2014 |
| KR | 10-1493820 B1 | 2/2015 |
| KR | 10-1516997 B1 | 5/2015 |
| KR | 10-2018-0028246 A | 3/2018 |

* cited by examiner

*Primary Examiner* — Luu T Pham
*Assistant Examiner* — Paul J Skwierawski
(74) *Attorney, Agent, or Firm* — INVENSTONE PATENT, LLC

(57) ABSTRACT

Disclosed is a method of providing a security service. The method is configured to include the steps of receiving a link connectable to a web page from a device of a user, connecting to a web page corresponding to the link through a remote browser and determining a risk of the connected web page, rendering a screen of the web page to be processed in the remote browser according to the determined risk, and streaming and transmitting the rendered web page screen to provide substantially the same user experience (UX) as a browser installed in the device.

6 Claims, 12 Drawing Sheets

METHOD FOR PROVIDING REMOTE SERVICE CAPABLE OF MULTILINGUAL INPUT AND SERVER PERFORMING THE SAME

CROSS-REFERENCE TO RELATED APPLICATIONS

This application claims the priority of Korean Patent Application No. 10-2021-0061603 filed on May 12, 2021, and No. 10-2021-0039119 filed on Mar. 25, 2021 in the Korean Intellectual Property Office, the disclosure of which is incorporated herein by reference.

BACKGROUND

Field

The present disclosure relates to a method of providing a security service to devices and a server performing the same.

Description of the Related Art

Today, with the development and the spread of supply smart devices capable of mobile communication, such as smartphones and tablets, the smart devices have been widely used in mobile offices, smart banking, stock trading, civil affairs handling such as electronic government, various life convenience services such as movie booking, a mobile instant messenger service, a social networking service (SNS), etc.

Among them, the mobile instant messenger service or the SNS are services which are used by any user using smart devices, and may also transmit a uniform resource locator (URL) in a text message instead of transmitting and receiving only a text. A receiver may check videos, images, web pages, and the like by clicking the URL displayed in the text message received from the smart devices.

As services using the smart devices are developed, fraud methods using the services are also diversified in addition thereto. Representatively, there is smishing to click a URL connected to a malicious code disguised as a text message sent by a trusted person or company to allow to steal personal information of a user or induce micro payment.

The background art of the invention has been prepared to more facilitate understanding of the present disclosure. It should not be understood that the matters described in the background art of the invention exist as prior arts.

SUMMARY

Various applications and security technologies have been developed to protect user's personal information and assets from malicious URLs. However, conventional techniques have an inconvenience of having to install an application that provides a security service to a smart device (hereinafter, referred to as a device).

In addition, there is disclosed a technology in which a separate server connected to the device reviews the safety of a message. However, in the case of a new type of fraud method or a new type of safety link, the server has limitations in reviewing safety itself.

Accordingly, it is required a method which executes a URL selected by a user in a separate browser to output the URL on a device screen, at the same time, provides a user experience (UX) to allow an execution screen to be substantially the same as a user's device (mobile web browser or application) Through this method, the server can provide a seamless security service to the user's device.

As a result, the present inventors intended to develop a method of executing a URL selected by a user through an isolated browser engine on a separate server. And the present inventors intended to develop a method of rendering and streaming a screen displayed in an isolated environment. Accordingly, the inventors of the present invention can protect the user's device from external attack.

Particularly, the present inventors have developed a method in which the user can select whether to directly access the URL or disconnect the connection through the user's device considering the risk level determined by the server and the user's own determination. Accordingly, the inventors of the present inventors can increase user reliability for the service.

The objects of the present disclosure are not limited to the aforementioned objects, and other objects, which are not mentioned above, will be apparent to a person having ordinary skill in the art from the following description.

According to an aspect of the present disclosure, there is provided a method of providing a security service. The method is configured to include the steps of receiving a link connectable to a web page from a device of a user, connecting to a web page corresponding to the link through a remote browser and determining a risk of the connected web page, rendering a screen of the web page to be processed in the remote browser according to the determined risk, and streaming and transmitting the rendered web page screen to provide substantially the same user experience (UX) as a browser installed in the device.

According to another aspect of the present disclosure, there is provided a method of providing a security service. The method is configured to include the steps of receiving identification data capable of calling an application from a device of a user, connecting to a web page of an application link corresponding to the identification data through a remote browser of a web container and determining a risk of the connected web page, determining access authority of the application executed in the remote browser according to the determined risk, rendering an execution screen of the application processed in the remote browser according to the determined access authority, and streaming and transmitting the execution screen of the application to provide substantially the same user experience (UX) as the device or the application installed in the device.

According to yet another aspect of the present disclosure, there is provided a security service providing server. The server includes a communication interface, a memory, and a processor operatively coupled with the communication interface and the memory, in which the processor is configured to receive a link connectable to a web page from a device of a user, connect to a web page corresponding to the link through a remote browser and determine a risk of the connected web page, render a screen of the web page to be processed in the remote browser according to the determined risk, and stream and transmit the rendered web page screen to provide substantially the same user experience (UX) as a browser installed in the device.

According to still another aspect of the present disclosure, there is provided a security service providing server. The server includes a communication interface, a memory, and a processor operatively coupled with the communication interface and the memory, in which the processor is configured to receive identification data capable of calling an application from a device of a user, connect to a web page of an application link corresponding to the identification data through a remote browser and determine a risk of the connected web page, determine access authority of the application executed in the remote browser according to the determined risk, render an execution screen of the application according to the determined access authority, and stream and transmit the execution screen of the application to provide substantially the same user experience (UX) as the device or the application installed in the device.

Details of other exemplary embodiments will be included in the detailed description of the invention and the accompanying drawings.

According to the present disclosure, since the security service providing server executes a URL in an isolated browser, renders the executed URL. And the server streams the rendered URL to the device, it is possible to protect user's personal information and assets from malicious web pages and applications included in the corresponding URL.

In addition, according to the present disclosure, since the URL screen executed in the remote browser can be rendered and streamed to have substantially the same user experience (UX) as that of the device. Accordingly, the server may provide the user with a natural security service, as if accessing the URL through the default browser installed on the device.

According to the present disclosure, the risk of the URL selected by the user is divided by stages to help the user in determining the stability of the corresponding URL itself.

In addition, according to the present disclosure, there is no need to install a separate security program to protect the user's device from a malicious URL. In addition, even in the case of a separate server that protects the device from a malicious URL, since only the isolated browser engine for executing the URL is required, it is possible to significantly reduce the development cost for providing the service.

The effects according to the present disclosure are not limited by the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
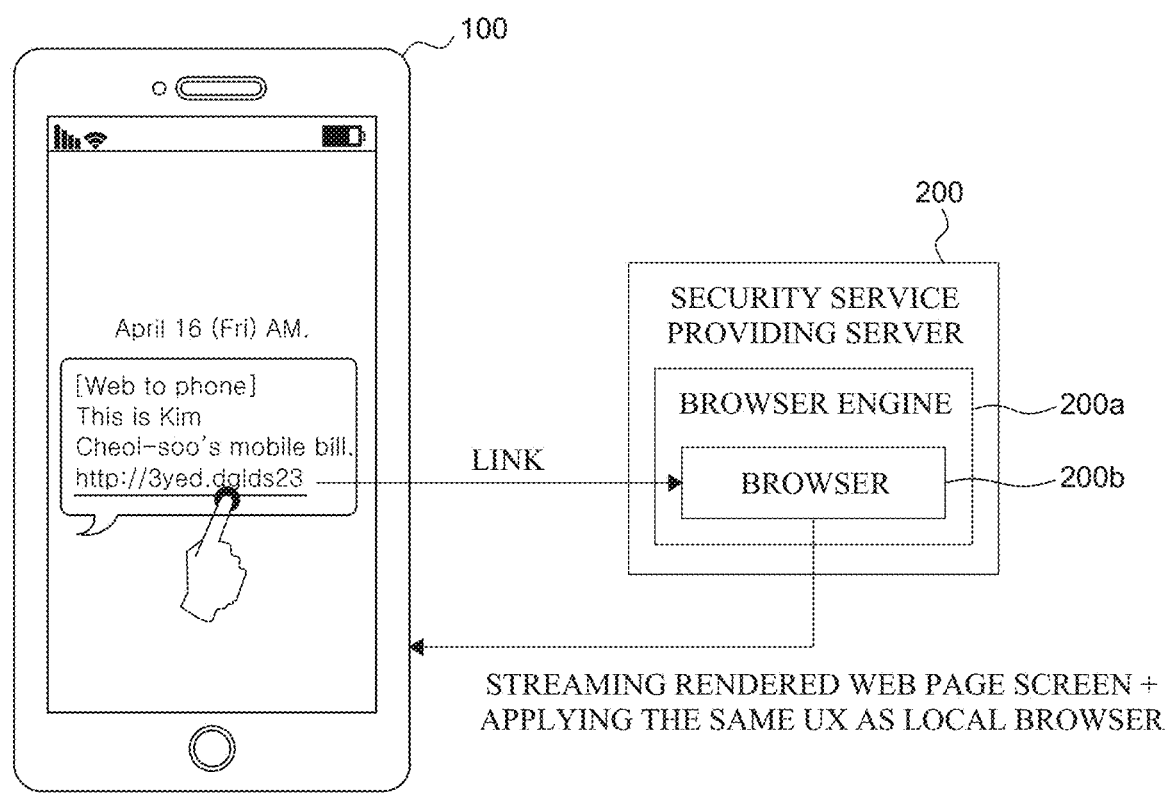
FIGS. 1 and 2 are schematic diagrams for describing an overview of a method of providing a security service according to an exemplary embodiment of the present disclosure.

Advantages and features of the present disclosure, and methods for accomplishing the same will be more clearly understood from exemplary embodiments to be described below in detail with reference to the accompanying drawings. However, the present disclosure is not limited to the exemplary embodiments set forth below, and will be embodied in various different forms. The exemplary embodiments are just for rendering the disclosure of the present disclosure complete and are set forth to provide a complete understanding of the scope of the invention to a person with ordinary skill in the art to which the present disclosure pertains, and the present disclosure will only be defined by the scope of the claims. In connection with the description of the drawings, like reference numerals may be used for like components.

In the present disclosure, the expression such as "have", "may have", "comprise", "may comprise" or the like indicates the presence of the corresponding feature (e.g., components such as figures, functions, operations, or parts) and does not exclude the presence of an additional feature.

In the present disclosure, the expression such as "A or B", "at least one of A and/or B", or "one or more of A and/or B" may include all possible combinations of items listed together. For example, "A or B", "at least one of A and B", or "at least one of A or B" may refer to all cases of (1) including at least one A, (2) including at least one B, or (3) including both at least one A and at least one B.

Expressions such as "first," and "second," used herein may modify various components regardless of the order and/or importance, and will be used only to distinguish one component from the other component, but are not limit the corresponding components. For example, a first user device and a second user device may represent different user devices, regardless of the order or importance. For example, a first component may be referred to as a second component, and similarly, the second component may also be referred to as the first component without departing from the scope of the present disclosure.

When a certain component (e.g., a first component) is referred to as being "(operatively or communicatively) coupled with/to" or "connected to" the other component (e.g., a second component), it will be understood that the component may be directly coupled to the other component, or may be coupled to the other component through another component (e.g., a third component). On the other hand, when a certain component (e.g., a first component) is referred to as being "directly coupled with/to" or "directly connected to" the other component (e.g., a second component), it will be understood that another component (e.g., a third component) is not present between the component and the other component.

The expression of "configured to" used herein may be changed and used to, for example, "suitable for", "having the capacity to", "designed to", "adapted to", "made to" or "capable of", depending on the situation. The term "configured (or set) to" may not necessarily mean "specially designed to" in hardware. Instead, in some situations, the expression "a device configured to" may mean the device "capable of" together with other devices or parts. For example, the phrase "a processor configured (set) to perform A, B, and C" may mean a dedicated processor (e.g., an embedded processor) for performing the corresponding operation, or a generic-purpose processor (e.g., a CPU or application processor) capable of performing the corresponding operations by executing one or more software programs stored in a memory device.

The terms used herein are used to illustrate only specific exemplary embodiments, and may not be intended to limit the scope of other exemplary embodiments. A singular form may include a plural form unless otherwise clearly meant in the contexts. The terms used herein, including technical or scientific terms, may have the same meaning as generally understood by those of ordinary skill in the art described in the present disclosure. The terms defined in a general dictionary among the terms used herein may be interpreted in the same or similar meaning as or to the meaning on the context of the related art, and will not be interpreted as an ideal or excessively formal meaning unless otherwise defined in the present disclosure. In some cases, even the terms defined in the present disclosure cannot be interpreted to exclude the exemplary embodiments of the present disclosure.

The features of various exemplary embodiments of the present disclosure can be partially or entirely coupled or combined with each other and can be interlocked and operated in technically various ways to be sufficiently appreciated by those skilled in the art, and the exemplary embodiments can be carried out independently of or in association with each other.

For the clarity of the interpretation of the present specification, hereinafter, the terms used in the present disclosure will be defined.

Figure 2:
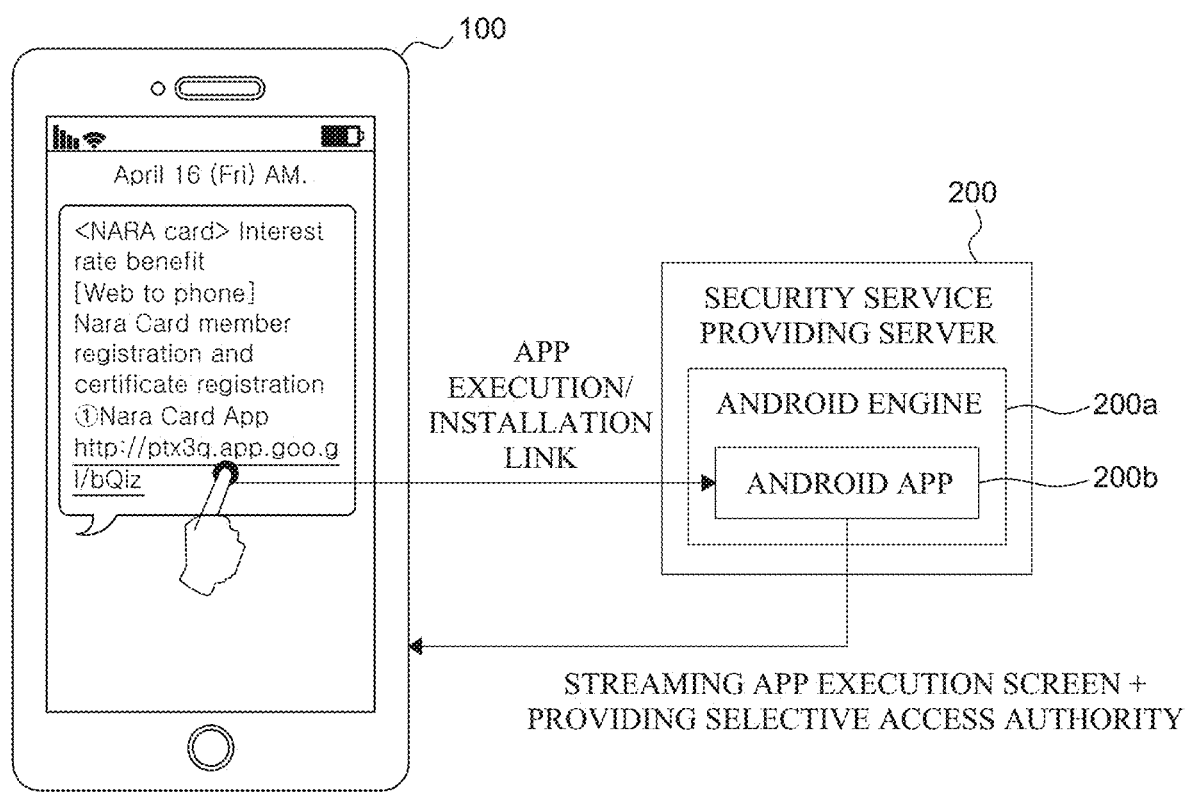

FIGS. 1 and 2 are schematic diagrams for describing an overview of a method of providing a security service according to an exemplary embodiment of the present disclosure.

Referring to FIG. 1, a method of providing a security service according to an exemplary embodiment of the present disclosure may provide a method for protecting a device 100 from an unverified link. Specifically, a browser engine 200a of a security service providing server 200 may connect to a link selected by a user preferentially over the default browser (local browser) installed in the device 100.

In addition, the security service providing server 200 according to an exemplary embodiment of the present disclosure may render and then stream a connected screen to provide substantially the same user experience (UX) as the local browser.

Here, the providing of substantially the same UX means, for example, displaying a URL address window and a web page display window. The device 100 may stream a web page rendered by the security service providing server 200 to display a web page display window. Accordingly, technically, the web page display window may be functionally different from a conventional browser, but provides the same UX. Furthermore, the providing of substantially the same UX may include, for example, applying and streaming an operation of changing a display on the device 100 such as a change from a vertical screen to a horizontal screen to display the operation in the same manner.

That is, in an exemplary embodiment of the present disclosure, the security service providing server 200 may connect to the link instead of the device 100 and provide a user experience as if a series of processes are being performed in the device 100.

Referring to FIG. 2, a method of providing a security service according to an exemplary embodiment of the present disclosure may provide a method for protecting the device 100 from a link connected to an unverified application. For example, an Android engine 200a of the security service providing server 200 may connect to an application execution or installation link preferentially over an application-compatible program installed on the device 100.

Furthermore, the security service providing server 200 may stream a screen/video of an Android app 200b executed or installed through the Android engine 200a. However, the security service providing server 200 may block some of the access authority of the application, depending on a risk of the corresponding link. Here, the access authority may mean user's access authority to functions provided by the corresponding application.

That is, as the user performs a specific function of the unverified web page or application, the security service providing server 200 may prevent a situation in which personal information of the user is leaked.

Figure 3:
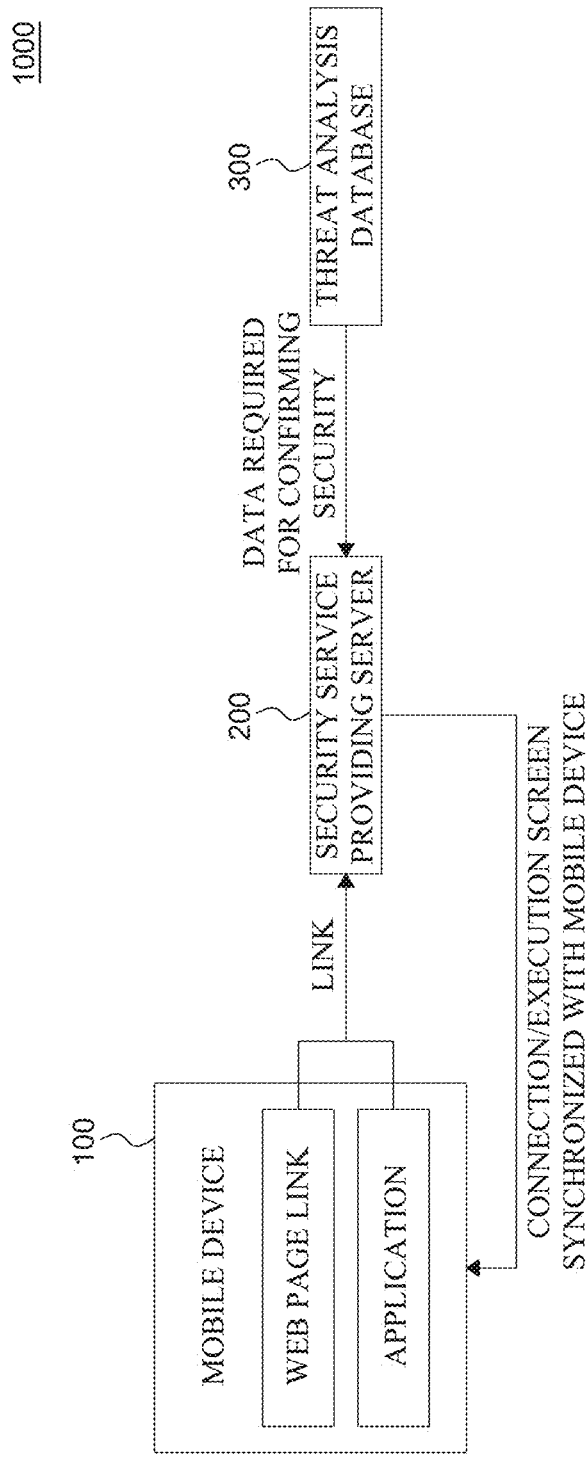
FIG. 3 is a block diagram illustrating a configuration of a system of providing a security service according to an exemplary embodiment of the present disclosure.

FIG. 3 is a block diagram illustrating a configuration of a system of providing a security service according to an exemplary embodiment of the present disclosure.

Referring to FIG. 3, a system 1000 of providing a security service may include a device 100, a security service providing server 200, and a threat analysis database 300.

The device 100 may be various types of portable devices carried by the user. For example, the device 100 may include a smartphone, a PC, a tablet PC, etc.

The device 100 may transmit a link selected by the user to the security service providing server 200. The link may be a link capable of outputting an image and a video, a link capable of connecting to a specific site, or a link capable of executing or installing an application.

The security service providing server 200 may connect to the web page through the link, or execute the application through the link, and stream the connected screen or the executed screen.

The security service providing server 200 may reflect output data of the device 100 or the local browser installed in the device 100 in the process of providing the connected screen. Here, the output data may be visual, auditory, and tactile output data configured in the browser application of the device 100. For example, the output data may include a resolution of the browser application, an alarm, and a pattern, an intensity, etc. of vibration according to a notification.

The device 100 may output a screen that is being streamed, and the user may undergo an experience as if the link is actually executed through the device 100.

On the other hand, the security service providing server 200 does not stream and provide all types of web pages/applications connected to the device 100. The security service providing server 200 may stream and provide only a web page/application safe from external threats.

The security service providing server 200 may determine a risk of the connected web page, and stream and provide different web page screens/application execution screens according to the determined risk.

The security service providing server 200 may determine the risk of the link (the risk of the web page) through a variety of criteria. As a typical example, the security service providing server 200 confirms whether a domain or path name included in the link is registered in a security list or a blocking list. And the security service providing server 200 may determine the risk of the link according to the confirmed result.

According to an exemplary embodiment, the risk of the link may be determined with criteria of "Safe (Risk 0)", "Caution (Risk 2)", and "Danger (Risk 3)", and may also be divided into more detailed indicators as needed.

The threat analysis database 300 may store various data for determining the risk of the link by the security service providing server 200. The threat analysis database 300 may transmit data required for security confirmation to the security service providing server 200. For example, the threat analysis database 300 may transmit an updated content of the security list or the blocking list to the security service providing server 200. As another example, the threat analysis database 300 may transmit an access pattern, a threat pattern, etc. of a dangerous site to the security service providing server 200.

Hereinafter, a configuration of the device 100 for receiving the security service, and a configuration of the security service providing server 200 for providing the security service will be described.

Figure 4:
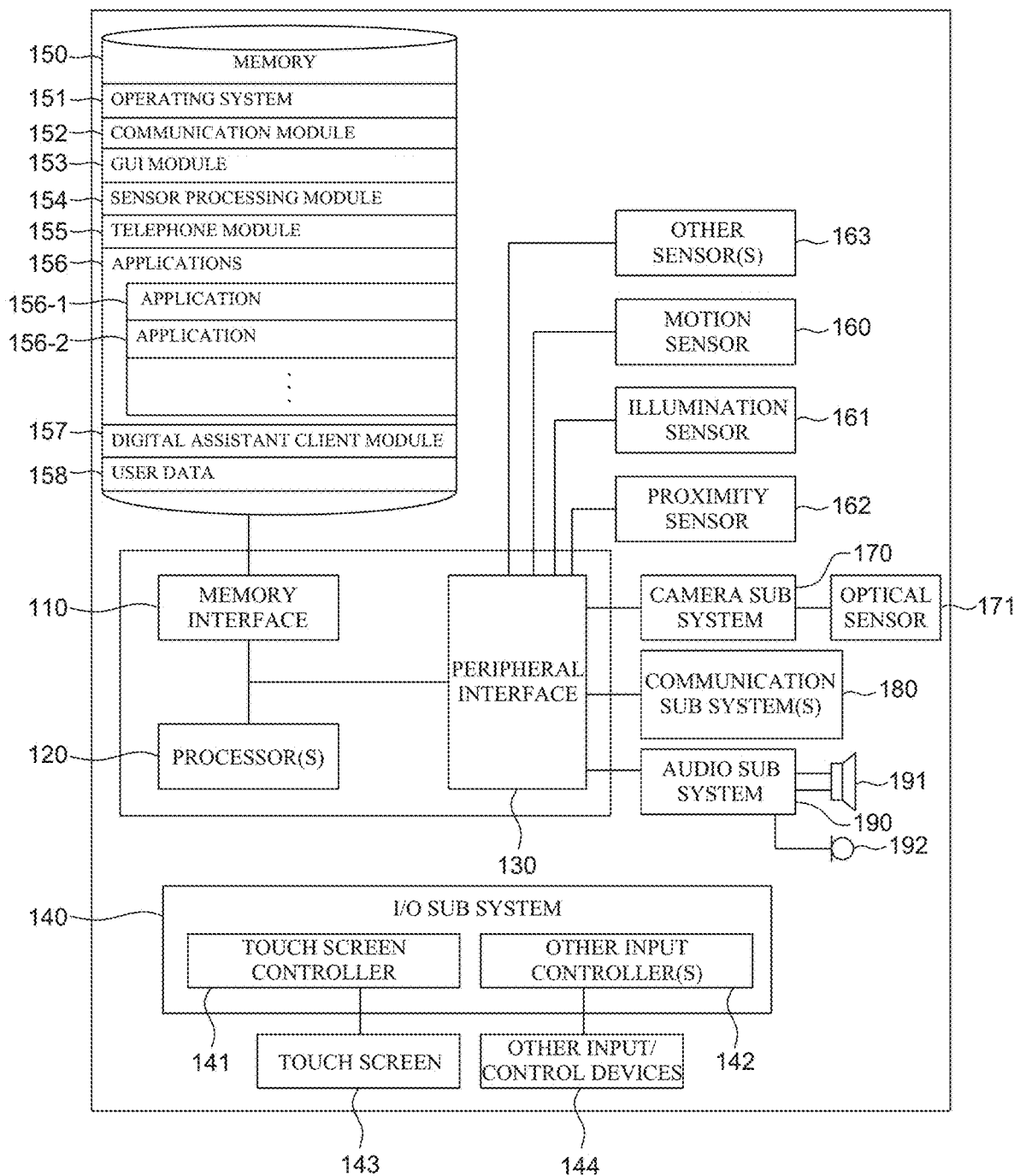
FIG. 4 is a block diagram illustrating a configuration of a device according to an exemplary embodiment of the present disclosure.

FIG. 4 is a block diagram illustrating a configuration of a device according to an exemplary embodiment of the present disclosure. Hereinafter, for convenience of description, the device 100 is described as the mobile device, but is not limited thereto, and may include a TV set-top, an Android TV, a desktop, and the like.

Referring to FIG. 4, the device 100 may include a memory interface 110, one or more processors 120, and a peripheral interface 130. Various components in the device 100 may be connected to each other by one or more communication buses or signal lines.

The memory interface 110 is connected to the memory 150 to transmit various data to the processors 120. Here, the memory 150 may include at least one type of storage medium of a flash memory type, a hard disk type, a multimedia card micro type, a card type memory (e.g., SD or XD memory, etc.), a RAM, an SRAM, a ROM, an EEPROM, a PROM, a network storage, a cloud, and a blockchain database.

In various exemplary embodiments, the memory 150 may store at least one of an operating system 151, a communication module 152, a graphical user interface (GUI) module 153, a sensor processing module 154, a phone module 155 and an application 156. Specifically, the operating system 151 may include instructions for processing a basic system service and instructions for performing hardware operations. The communication module 152 may communicate with at least one of one or more other devices, computers and servers. The GUI module 153 may process a graphical user interface. The sensor processing module 154 may process sensor-related functions (e.g., processing a received voice input using one or more microphones 192). The phone module 155 may process phone-related functions. The application module 156 may perform various functions of the user application, such as electronic messaging, web browsing, media processing, searching, imaging, and other process functions. In addition, the device 100 may store one or more software applications 156-1 and 156-2 associated with any one type of service in the memory 150. In an exemplary embodiment of the present disclosure, the software applications 156-1 and 156-2 may be applications capable of outputting a web page screen streamed by the security service providing server 200 and maintaining or releasing the activation of the security service according to a user's selection. Here, when the activation of the security service is released, the device 100 may connect to the link through the default browser (different types of applications) stored in the memory 150.

In various exemplary embodiments, the memory 150 may store a digital assistant client module 157 (hereinafter, referred to as a DA client module), and accordingly, may store instructions for performing client-side functions of a digital assistant and various user data 158 (e.g., other data such as user health status data, user-customized vocabulary data, preference data, to-do lists, etc.).

On the other hand, the DA client module 157 may acquire a voice input, a text input, a touch input and/or a gesture input of the user through various user interfaces (e.g., an I/O subsystem 140) provided in the device 100.

In addition, the DA client module 157 may output audio-visual and tactile types of data. For example, the DA client module 157 may output data consisting of combinations of at least two of voice, sound, notifications, text messages, menus, graphics, video, animation, and vibration. In addition, the DA client module 157 may communicate with a digital assistant server (not illustrated) using a communication subsystem 180.

In various exemplary embodiments, the DA client module 157 may collect additional information about a surrounding environment of the device 100 from various sensors, subsystems and peripheral devices in order to configure a context associated with the user input. For example, the DA client module 157 may infer a user's intention by providing context information with the user input to the digital assistant server. Here, the context information that may be accompanied by the user input may include sensor information, for example, lighting, surrounding noise, surrounding temperature, images and videos in a surrounding environment, and the like. For another example, the context information may include physical states of the device 100 (e.g., device orientation, device location, device temperature, power level, speed, acceleration, motion pattern, cellular signal strength, etc.). For yet another example, the context information may include information related to software states of the device 100 (e.g., processes running on the device 100, installed programs, previous and current network activities, background services, error logs, resource usage, etc.).

In various exemplary embodiments, the memory 150 may include added or deleted instructions. Furthermore, the device 100 may include additional configurations in addition to the configurations illustrated in FIG. 4, or may exclude some configurations.

The processor 120 may be coupled with the memory interface 110, the peripheral interface 130, and the I/O subsystem 140 to control an overall operation of the device 100.

The processor 120 may correspond to a computing device such as a central processing unit (CPU) or an application processor (AP). In addition, the processor 120 may be implemented in the form of an integrated chip (IC), such as a system on chip (SoC) integrated with various computing devices.

According to the exemplary embodiment, the processor 120 may transmit the link selected by the user to the security service providing server 200. And the processor 120 may output (stream) a web page to be streamed and transmitted by the security service providing server 200.

The processor 120 may acquire a link from an SMS, and an MMS, or acquire a link through the application installed on the device 100. In other words, the link may be included in a text message. And the link may be included in a conversation content sent by another user through a messenger (application).

On the other hand, the link may be displayed on a touch screen 143 with a basic structure such as "protocol://domain name:port" (e.g., http://www.example.com: 80/path/to). Or the link may be displayed on the touch screen 143 with a structure without revealing a protocol and other configurations, such as "SSG.COM".

The peripheral interface 130 is coupled with various sensors, subsystems and peripheral devices to provide data so that the device 100 may perform various functions. Here, it can be understood that confirming whether the device 100 performs any function is performed by the processor 120.

The peripheral interface 130 may receive data from a motion sensor 160, a lighting sensor (optical sensor) 161 and a proximity sensor 162, and as a result, the device 100 may perform orientation, lighting, and proximity sensing functions, etc. For another example, the peripheral interface 130 may receive data from other sensors 163 (positioning system—GPS receiver, temperature sensor, and biometric sensor), and as a result, the device 100 may perform functions associated with other sensors 163.

In various exemplary embodiments, the device 100 may include a camera subsystem 170 coupled with the peripheral interface 130 and an optical sensor 171 coupled thereto, and as a result, the device 100 may perform various photographing functions such as photographing, video clip recording, etc.

In various exemplary embodiments, the device 100 may include a communication subsystem 180 coupled with the peripheral interface 130. The communication subsystem 180 is configured as one or more wired/wireless networks, and may include various communication ports, radio frequency transceivers, and optical transceivers.

In various exemplary embodiments, the device 100 includes an audio subsystem 190 coupled with the peripheral interface 130, and the audio subsystem 190 includes one or more speakers 191 and one or more microphones 192, so that the device 100 may perform a voice-operating function, such as voice recognition, voice reproduction, digital recording, and phone functions, etc.

In various exemplary embodiments, the device 100 may include an I/O subsystem 140 coupled with the peripheral interface 130. For example, the I/O subsystem 140 may control a touch screen 143 included in the device 100 through a touch screen controller 141. As an example, the touch screen controller 141 may detect contact and motion of the user or interruption of the contact and motion by using any one of a plurality of touch sensing techniques, such as capacitive, resistive, infrared, and surface elastic wave techniques, proximity sensor arrays, etc. For another example, the I/O subsystem 140 may control other input/control devices 144 included in the device 100 through other input controller(s) 142. As an example, the other input controller(s) 142 may control a pointer device such as one or more buttons, rocker switches, thumb-wheels, infrared ports, USB ports, and styluses.

Figure 5:
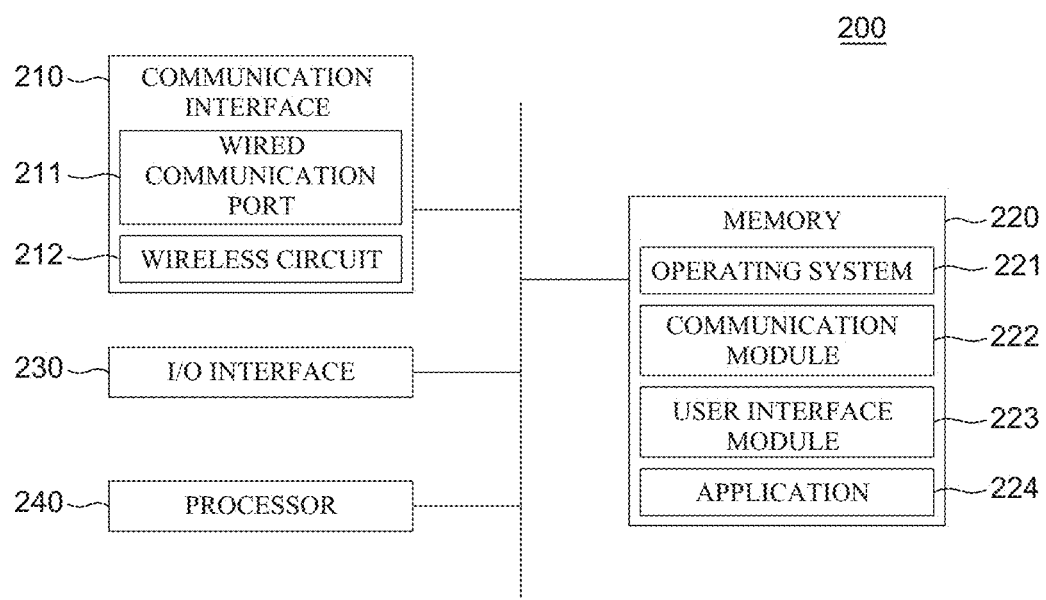
FIG. 5 is a block diagram illustrating a configuration of a security service providing server according to an exemplary embodiment of the present disclosure.

FIG. 5 is a block diagram illustrating a configuration of a security service providing server according to an exemplary embodiment of the present disclosure.

Referring to FIG. 5, the security service providing server 200 may include a communication interface 210, a memory 220, an I/O interface 230, and a processor 240. Each configuration may communicate with each other through one or more communication buses or signal lines.

The communication interface 210 is coupled with the device 100 and the threat analysis database 300 through a wired/wireless communication network to transmit and receive data. For example, the communication interface 210 may receive output data, connection data to the link, key/mouse input data, and texts from the device 100. Or the communication interface 210 may receive updated contents of the security list or the blocking list from the threat analysis database 300. For another example, the communication interface 210 may stream and transmit a web page screen to the device 100. Here, the web page screen includes an input object generated on the basis of a text, and the output data previously received may be applied.

On the other hand, the communication interface 210 described above includes a wired communication port 211 and a wireless circuit 212. Here, the wired communication port 211 may include one or more wired interfaces, such as Ethernet, a universal serial bus (USB), and a firewire. In addition, the wireless circuit 212 may transmit and receive data with an external device through an RF signal or an optical signal. In addition, wireless communication may use at least one of a plurality of communication standards, protocols and technologies, such as GSM, EDGE, CDMA, TDMA, Bluetooth, Wi-Fi, VoIP, and Wi-MAX, or any other suitable communication protocols.

The memory 220 may store various data used in the security service providing server 200. For example, the memory 220 may store identification information of the device 100 providing the security service. And the memory 220 may store output data of each device 100. In addition, instead of the threat analysis database 300, the memory 220 may store the security list and the blocking list. And the memory 220 may store a security content newly updated through another device 100 or administrator.

In various exemplary embodiments, the memory 220 may include a volatile or nonvolatile recording medium capable of storing various data, instructions, and information. For example, the memory 220 may include at least one type of storage medium of a flash memory type, a hard disk type, a multimedia card micro type, a card type memory (e.g., an SD or XD memory, etc.), a RAM, an SRAM, a ROM, an EEPROM, a PROM, a network storage, a cloud, and a blockchain database.

In various exemplary embodiments, the memory 220 may store at least one configuration of the operating system 221, the communication module 222, the user interface module 223, and one or more applications 224.

The operating system 221 (e.g., embedded operating system such as LINUX, UNIX, MAC OS, WINDOWS, or VxWorks) may include various software components and drivers for controlling and managing general system operations (e.g., memory management, storage device control, power management, etc.), and may support communication among various hardware, firmware, and software components.

The communication module 223 may support communication with other devices through the communication interface 210. The communication module 220 may include various software components for processing the data received by the wired communication port 211 or the wireless circuit 212 of the communication interface 210.

The user interface module 223 receives a request or input of the user from a keyboard, a touch screen, a microphone, etc. through the I/O interface 230, and may provide a user interface on the display.

The application 224 may include a program or module that is configured to be executed by one or more processors 240. Here, the application for providing the security service may be on a server farm.

The I/O interface 230 may connect at least one of I/O devices (not illustrated) of the security service providing server 200, such as a display, a keyboard, a touch screen and a microphone, with the user interface module 223. The I/O interface 230 receives a user input (e.g., voice input, keyboard input, touch input, etc.) with the user interface module 223, and may process the instructions according to the received input.

The processor 240 is coupled with the communication interface 210, the memory 220, and the I/O interface 230 to control an overall operation of the security service providing server 200. And The processor 240 may perform various instructions to provide a web page screen with substantially the same UX as the browser installed on the device 100 through an application or program stored in the memory 220.

The processor 240 may correspond to a computing device such as a central processing unit (CPU) or an application processor (AP). In addition, the processor 240 may be implemented in the form of an integrated chip (IC), such as a system on chip (SoC) integrated with various computing devices. Alternatively, the processor 240 may include a module for calculating an artificial neural network model, such as a neural processing unit (NPU).

Hereinafter, a method of providing a security service capable of protecting the device 100 from an unverified link by the processor 240 will be described.

Figure 6:
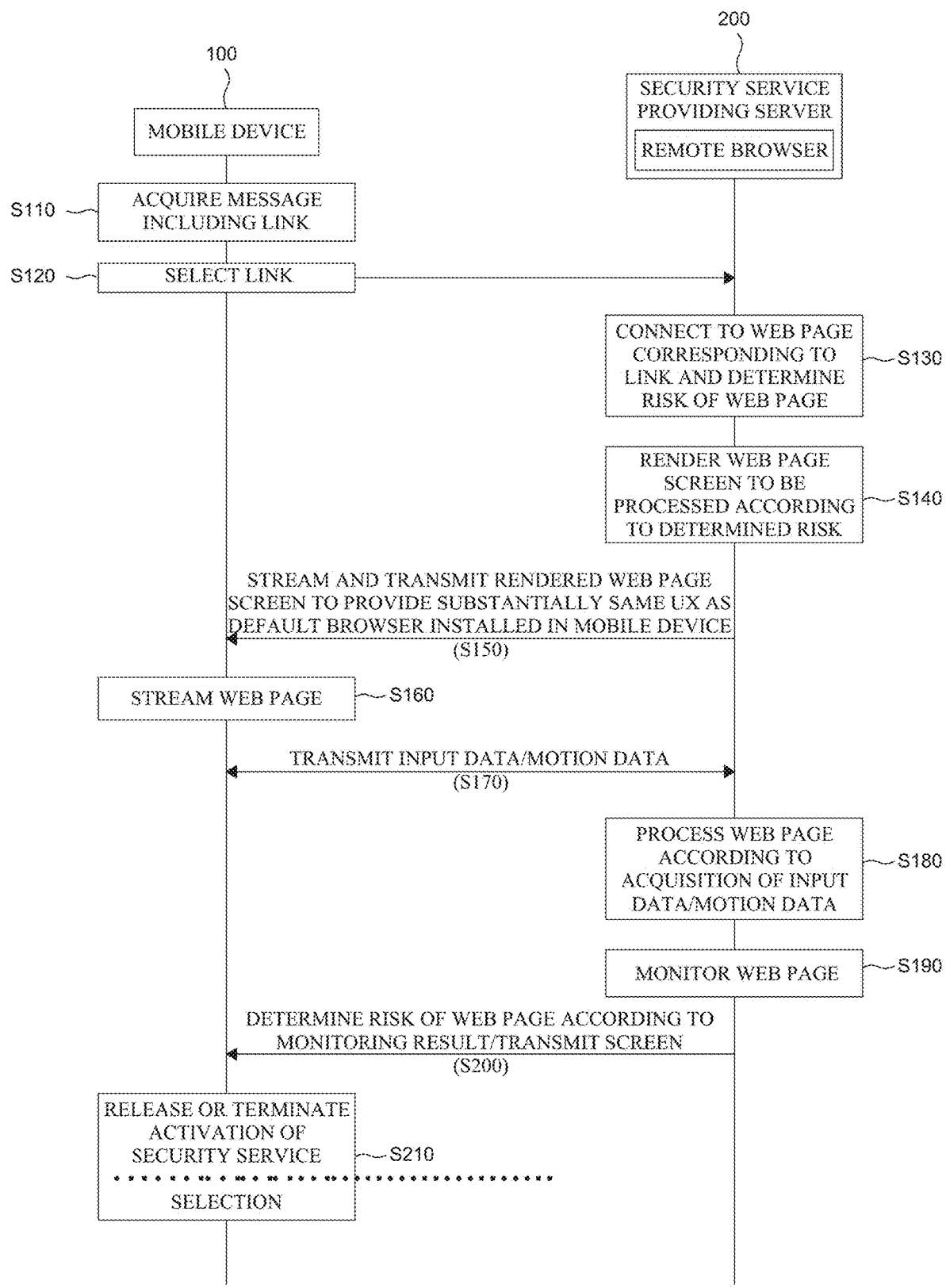
FIG. 6 is a schematic flowchart of a method of providing a security service for a web page according to an exemplary embodiment of the present disclosure.

FIG. 6 is a schematic flowchart of a method of providing a security service for web pages according to an exemplary embodiment of the present disclosure.

Referring to FIG. 6, the device 100 may acquire a message including a link (S110). For example, the device 100 may acquire a short message service (SMS) containing only texts, and a multimedia message service (MMS) with attachable multimedia files such as images or videos. Here, the SMS and the MMS may include links. For another example, the device 100 may acquire a message including a link from another user through a messenger service application (e.g., Line), and a social network service application (e.g., Facebook, and Instagram).

After step S110, the device 100 may transmit a link selected by the user to the security service providing server 200 (S120). Accordingly, the processor 240 of the service providing server 200 may receive a link connectable to the web page through the communication interface 210.

After step S120, the processor 240 of the security service providing server 200 may connect to a web page corresponding to the link through a remote browser. And the processor 240 determine a risk of the connected web page (S130). And then, the processor 240 may render a screen of the web page to be processed in the remote browser according to the determined risk (S140). That is, the processor 240 may change the screen of the web page in a streamable form, so as to share the screen of the web page with the device 100 in real time.

According to the exemplary embodiment, the processor 240 may determine the risk of the web page through a list stored in the memory 220. Specifically, the processor 240 may determine the risk of the web page, depending on whether the domain or path name included in the link is registered in the security list or the blocking list. In addition, the processor 240 may determine the risk of the web page, depending on whether any one phrase (phrase including at least one of Korean, English, numbers and special characters) included in the link is registered in the security list or the blocking list.

According to another exemplary embodiment, the processor 240 may confirm whether to automatically attempt to access the device 100 from the connected web page. And the processor 240 may determine the risk of the web page according to the confirmed result. More specifically, the processor 240 may confirm whether to automatically acquire access authority of the device 100 from the connected web page. And the processor 240 may confirm whether to automatically collect the user data or local data stored in the device 100 in the connected web page.

That is, If the web page performs an operation for acquiring data associated with the user without a user's permission, the processor 240 may consider the web page to be insecure.

According to various exemplary embodiments, the processor 240 may divide the risk of the web page into three stages of "Safe (Risk 0)", "Caution (Risk 2)", and "Danger (Risk 3)" and determine the risk of the connected web page.

On the other hand, the processor 240 may process the screen of the web page, depending on the risk determined above. For example, when the processor 240 determines the risk of the web page as "0", the processor 240 may provide the screen of the connected web page to the user as it is. When the processor 240 determines the risk of the web page as "1, 2", the processor 240 may entirely or partially delete the screen of the connected web page.

The processor 240 may include a request for deactivation of the security service on a web page screen according to the determined degree of risk. If a request for deactivating the security service is received through the communication interface 210, the processor 240 may terminate the remote browser and transmit a connection request to the link to the browser installed in the device 100.

The processor 240 may select one of the various methods to determine the risk of the web page. And the processor 240 may also determine the risk of the web page in the order illustrated in FIG. 7 below.

Figure 7:
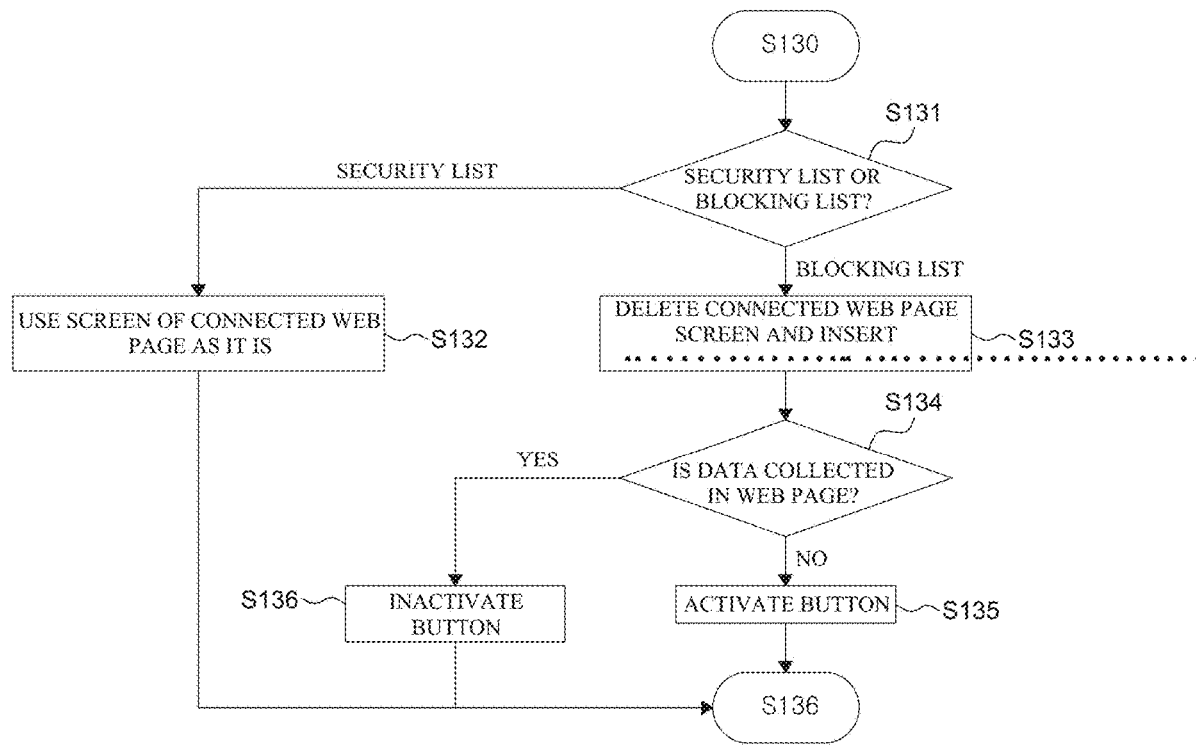
FIG. 7 is a flowchart of specifying step S130 illustrated in FIG. 6.

FIG. 7 is a flowchart of specifying step S130 illustrated in FIG. 6 and FIGS. 8A to 8C are exemplary diagrams of a security service interface screen provided to a device according to an exemplary embodiment of the present disclosure.

Referring to FIG. 7, the processor 240 may confirm whether a domain or address included in the link is registered in a security list or a blocking list (S131).

As the confirmed result, when the domain or address included in the link is registered in the security list, the processor 240 may use the screen of the web page connected to the device 100 as it is (S132).

Figure 8A:
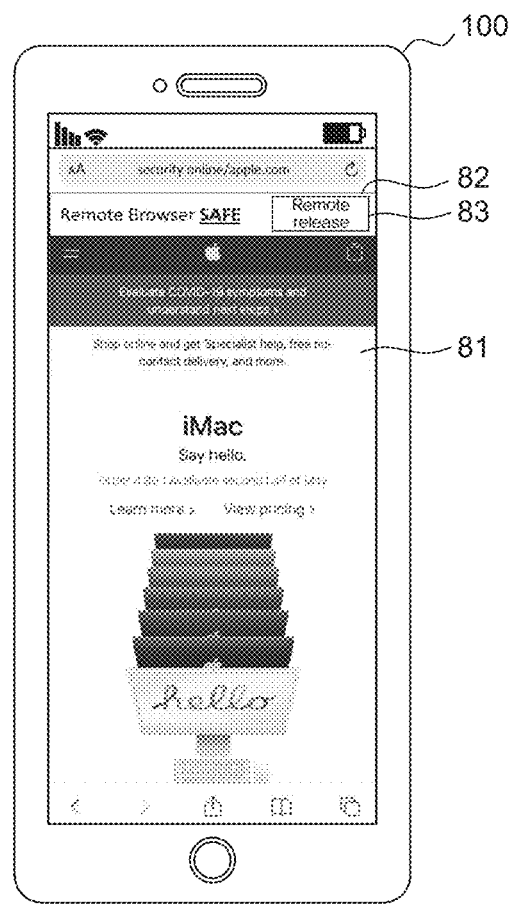
FIGS. 8A to 8C are exemplary diagrams of a security service interface screen provided to a device according to an exemplary embodiment of the present disclosure.

In this regard, referring to FIG. 8A, the device 100 may output a connection screen of a web page corresponding to the link through the security service providing server 200. FIG. 8A is an exemplary diagram of a screen 81 output when the domain or address included in the link is registered in the security list. An area of the screen 81 output by the device 100 may be provided with an instruction window 82 capable of displaying that the security service is being provided and a button 83 capable of releasing the activation of the security service.

According to the exemplary embodiment, the instruction window 82 may be hidden in an area of the screen 81 so that the user cannot recognize that the corresponding link is being provided in the security service providing server 200.

Figure 8B:
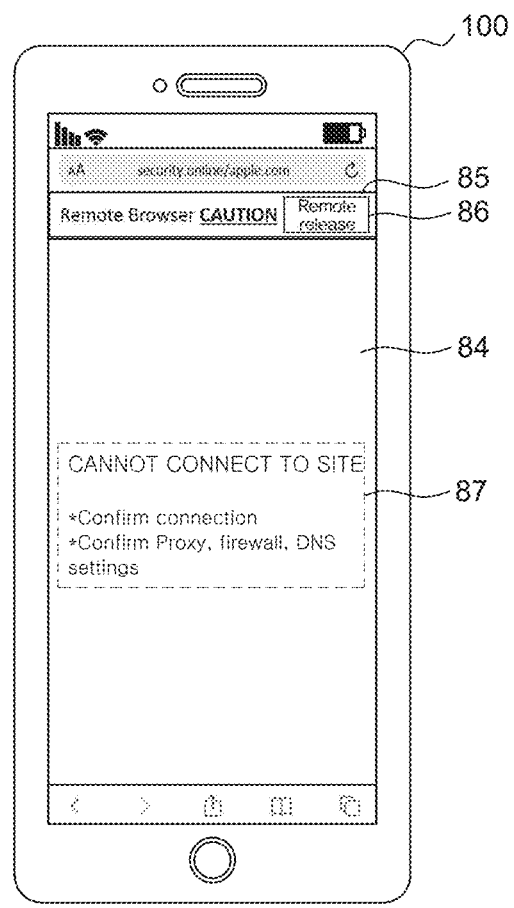
Figure 8C:
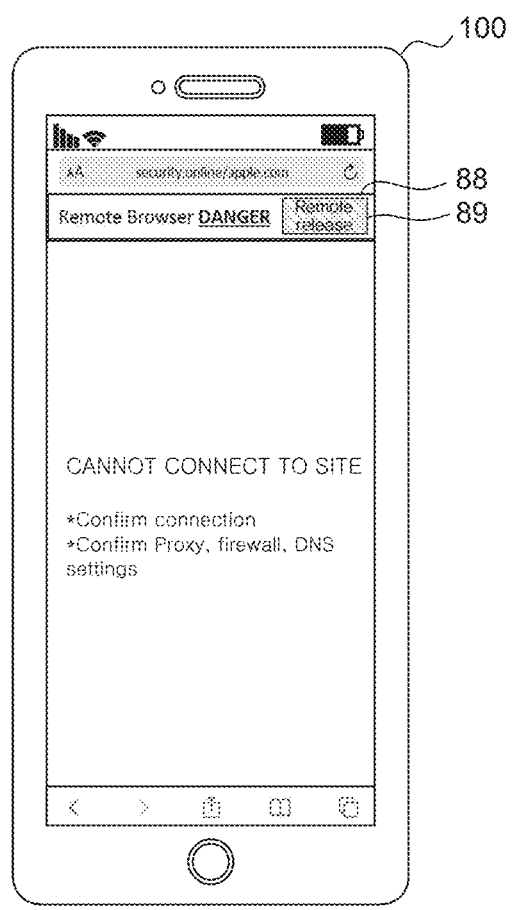

On the contrary, when the domain or address included in the link is registered in the blocking list, the processor 240 may delete the screen of the connected web page. And the processor 240 may insert an "unconnectable" message. FIGS. 8B and 8C are exemplary diagrams of a screen output when the domain or address included in the link is registered in the blocking list. An area of a screen 84 output by the device 100 may be provided with instruction windows 85 and 88 capable of displaying that the security service is being provided and an "unconnectable" message 87.

The processor 240 may not provide the user with authority capable of releasing the activation of the security service according to a rank of the risk.

Referring back to FIG. 7, the processor 240 may confirm whether to collect the data of the device 100 automatically in the web page (S134). When an attempt for collecting data without user's permission is not found, the processor 240 may insert a button capable of releasing the activation of the security service (S135). For example, as illustrated in FIG. 8B, the processor 240 may activate and provide a button 86 capable of releasing the activation of the security service in the instruction window 85.

On the contrary, when the attempt for collecting data without user's permission is found, the processor 240 may insert a button capable of releasing the activation of the security service in an inactivated state (S136). For example, as illustrated in FIG. 8C, the processor 240 may inactivate the button 89 capable of canceling the activation of the security service in the guide window 88 and provide it.

Referring back to FIG. 6, the processor 240 may stream and transmit a rendered web page screen (S150). The processor 240 may provide substantially the same UX as the default browser installed in the device 100. That is, the processor 240 may provide the device 100 with substantially the same screen as the default browser installed in the device 100. So that the user cannot recognize that the security service is currently being used.

Before rendering the screen of the web page, the processor 240 may acquire the output data of the default browser (the browser installed in the device) or the output data of the device 100 from the device 100. Here, the output data may include various types of output data which can be visually and acoustically confirmed, such as resolution, font setting, page zoom in/out setting, language setting, tap setting, and screen rotation setting of the device 100 or the default browser.

The processor 240 may apply the acquired output data to the web page screen to be processed in the remote browser. For example, the processor 240 may change the font and the resolution of the web page screen.

That is, the processor 240 may provide a web page screen as if the link is executed in the browser of the device 100.

After step S150, the device 100 may stream the web page transmitted by the security service providing server 200 in real time (S160). While the streaming is performed by the security service providing server 200, the device 100 and the security service providing server 200 may share the web page screen. Further, the processor 240 may continue to stream and transmit the web page screen to the device 100 until receiving a request for releasing the activation of the security service from the device 100.

After step S160, the device 100 may acquire user operation data in the web page screen and transmit the acquired user operation data to the security service providing server 200 (S170). That is, the user may search a current web page or a new web page while maintaining the state connected to the link through the security service providing server 200 other than the device 100. The processor 240 may confirm the web page searching process of the user through the user operation data.

Specifically, the processor 240 may acquire key and mouse input data of the user through the web page screen. Or the processor 240 may acquire motion data of the device 100. For example, the processor 240 may acquire right-click and left-click input data in the web page screen, data selected according to left/right click, zoom in/out input data, text data input for search, etc. through the communication interface 210. For another example, the security processor 240 may acquire motion data in which the device 100 is changed from vertically to horizontally through the communication interface 210.

On the other hand, the text data may be acquired through an input device installed in the device 100. For example, the key input data may be acquired through a virtual keyboard displayed on the touch screen 143 of the device 100. Or the key input data may be acquired through other input/control devices (keyboard) 144 coupled to the device 100.

The processor 240 may detect a position of a virtual input window on the web page screen transmitted to the device 100. Specifically, the processor 240 may analyze a source code on the web page screen to detect an INPUT area capable of displaying texts. And the processor 240 may specify the INPUT area as the position of the virtual input window.

Thereafter, the processor 240 may receive a text acquired in the device 100 and input to the position of the virtual input window. In the process of rendering the web page screen, the processor 240 may generate an input object including the received text. And then the processor 240 may stream and transmit the generated input object to the position of the virtual input window.

That is, the processor 240 may image the text acquired from the device 100 as it is without requiring a text input device suitable for a type of text (e.g., Korean, English, Chinese, and Russian, etc.) to be input by the user.

After step S170, the processor 240 may process a web page according to the acquisition of the user operation data (input data/motion data) (S180). For example, the processor 240 may move to a new web page. Or the processor 240 may change the web page screen according to output data.

After step S180, the processor 240 may monitor the corresponding screen, before transmitting the screen of the web page to the device 100 through the communication interface 210 (S190).

The processor 240 may determine a risk of a new web page screen in the same manner as in step S130 when moving to the new web page (S200). In addition, the processor 240 may delete the screen of the web page as it is or partially according to the determined risk and then transmit the deleted screen to the device 100. In the same manner as in step S150, the processor 240 may render the screen of the web page to be processed. And the processor 240 may stream and transmit the rendered web page screen to the device 100.

Through steps S160 to S200, the user may review the risk of the web page to be newly moved while maintaining the state connected to the link through the security service providing server 200 other than the device 100.

After step S200, the device 100 may release or terminate the activation of the security service according to the user's selection (S210). For example, when the device 100 acquires input data corresponding to "remote release", the device 100 may provide the acquired input data to the security service providing server 200. Accordingly, the processor 240 of the security service providing server 200 may terminate the remote browser and transmit a connection request to the link to the browser installed in the device 100. As another example, when the device 100 acquires input data corresponding to "termination", the device 100 may terminate the connection with the security service providing server 200.

So far, a method of protecting the device 100 from an unverified link through the processor 240 of the security service providing server 200 has been described.

Hereinafter, a method of protecting the device 100 from an unverified application through the processor 240 of the security service providing server 200 will be described.

Figure 9:
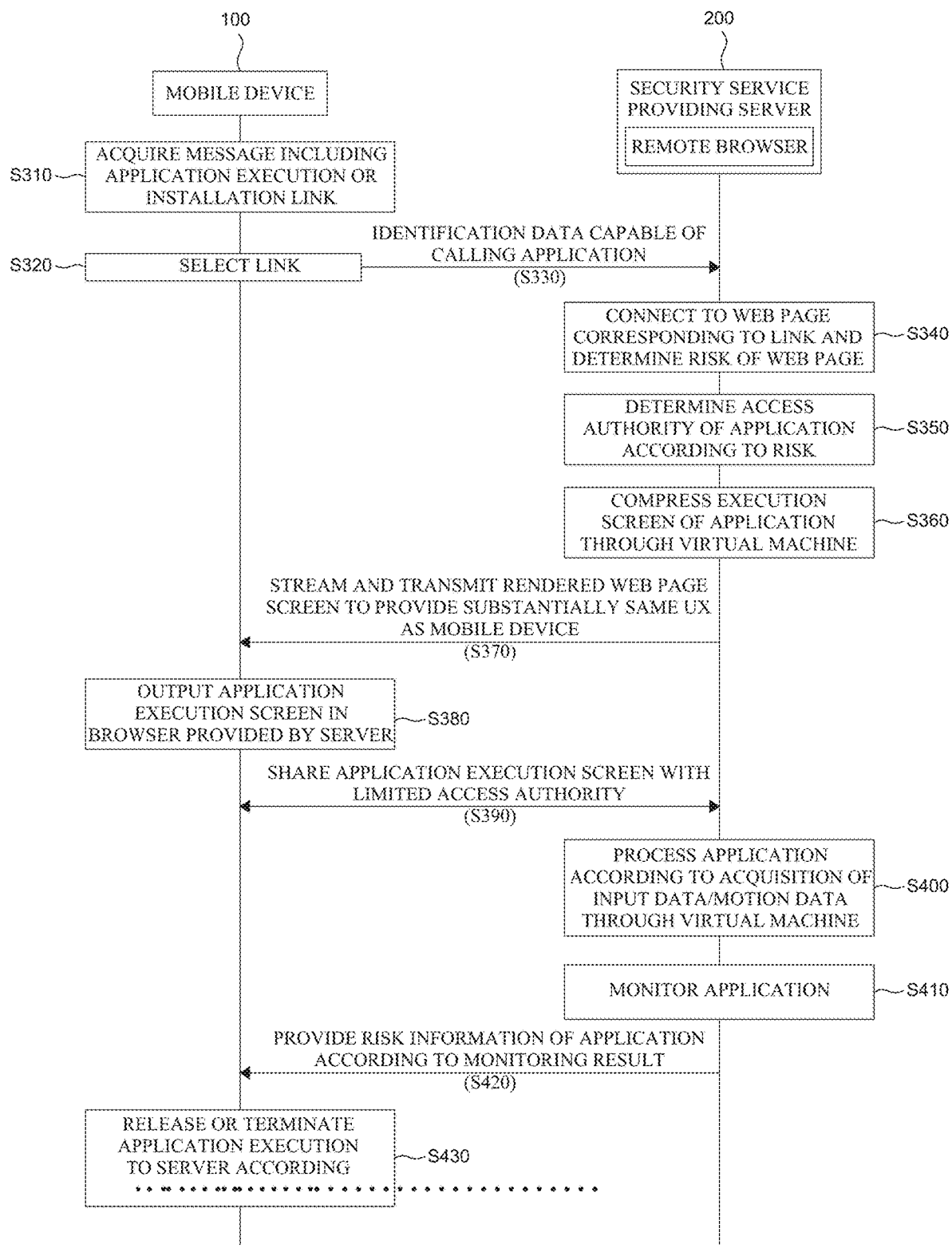
FIG. 9 is a schematic flowchart of a method of providing a security service for an application according to an exemplary embodiment of the present disclosure.
Figure 10:
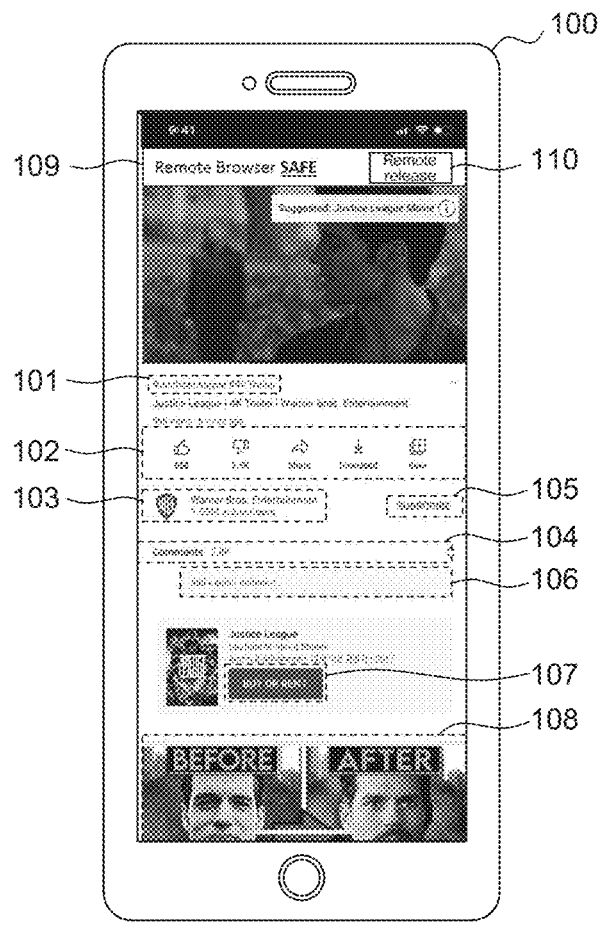
FIG. 10 is an exemplary diagram of a security service interface screen for an application provided to a device according to an exemplary embodiment of the present disclosure.

FIG. 9 is a schematic flowchart of a method of providing a security service for an application according to an exemplary embodiment of the present disclosure and FIG. 10 is an exemplary diagram of a security service interface screen for an application provided to a device according to an exemplary embodiment of the present disclosure.

Referring to FIG. 9, the device 100 of the user may acquire a message including an application execution/installation link (S310).

According to an exemplary embodiment, the device 100 may acquire an SMS or MMS including a link. Or the device 100 may acquire a message including a link from other users through a messenger service application or a social network service application.

According to another exemplary embodiment, the device 100 may acquire a message including an application execution/installation link within a web page connected through a default browser. Or the device 100 may acquire only a link without a message.

After step S310, the device 100 may receive a specific link selected from the user (S320). And then, the device 100 may transmit the link to the security service providing server 200 (S330). Accordingly, the processor 240 of the service providing server 200 may receive identification data capable of calling an application through the communication interface 210. Specifically, the identification data may be a package ID for the application. Or the identification data may be an installation link for the application.

After step S330, the processor 240 may connect to a web page of the application link corresponding to the identification data through a remote application. And the processor 240 may determine a risk of the connected web page (S340). In addition, the processor 240 may determine access authority of the application executed in the remote application according to the determined risk (S350).

For example, when the application link is an application installation link, the processor 240 may determine whether to provide a connected web page screen to the device 100.

For another example, when the application link is an application execution link, the processor 240 may determine access authority for each function according to the risk in the executed application. Specifically, the processor 240 may determine access authority for each function in the execution screen of the application to be output to the device 100. Specifically, the processor 240 may block access authority to a function to be linked with the user information in the case of an application having a high risk.

According to the exemplary embodiment, the execution of the remote application may be driven in a virtual machine provided in the security service providing server 200. For example, an application that provides a video streaming service shown in FIG. 10 is driven in a virtual machine. And the device 100 streams and displays a screen of the application that is driven in the virtual machine.

Referring to FIG. 10, in an application execution screen that provides the video streaming service, it is possible to block access authority to the function linked with the user information. And it is possible to permit access authority to the function that is not linked to the user information. For example, the function of blocking the access authority may include functions 102 (good, bad, share, download, and save) capable of being stored in the memory 150 of the device 100. And the function of blocking the access authority may include a subscription function 105 in which a user ID may be exposed, and a writing comment function 106. For another example, a function of permitting the access authority may include the functions 101, 103, 107, and 108 capable of watching other associated videos.

Referring back to FIG. 9, the processor 240 may input arbitrarily user data as input data to the application executed in the virtual machine. That is, with respect to the application executable only when inputting the user data, the processor 240 may arbitrarily input the user data.

On the other hand, the processor 240 may determine the risk of a web page (application link) connected through a list stored in the memory 220. And the processor 240 may determine the access authority according thereto. Specifically, the processor 240 may determine the risk of the web page, depending on whether the domain or path name included in the application link is registered in the security list or the blocking list. For example, when the domain or path name is registered in the security list, the processor 240 may permit the access authority of the user in the application executed through the virtual machine. For another example, when the domain or path name is registered in the blocking list, the processor 240 may block at least partially the access authority of the user in the application executed through the virtual machine.

In addition, the processor 240 may determine the risk of the web page, depending on whether any one phrase (phrase including at least one of Korean, English, numbers and special characters) included in the application link is registered in the security list or the blocking list. And the processor 240 may determine access authority according thereto.

According to another exemplary embodiment, the processor 240 may confirm whether to automatically attempt to access the device 100 from the connected web page. And then, the processor 240 may determine the risk of the web page according to the confirmed result and determine access authority according thereto. More specifically, the processor 240 may confirm whether to automatically acquire access authority of the device 100 from the connected web page, and whether to automatically collect the user data or local data stored in the device 100 in the connected web page.

That is, the processor 240 may regard that the corresponding web page is not safe when the web page performs an operation for acquiring data associated with the user without a user's permission.

According to various exemplary embodiments, the processor 240 may divide the risk of the web page corresponding to the application link into three stages of "Safe (Risk 0)", "Caution (Risk 2)", and "Danger (Risk 3)" and determine the risk of the connected web page. When the processor 240 determines the risk of the web page as "0", the processor 240 may permit all access authorities of the user in the application execution screen. Further, when the processor 240 determines the risk of the web page as "2", the processor 240 may block all the access authorities of the user in the application execution screen.

After step S350, the processor 240 may compress (or render) the application execution screen for streaming (S360). The processor 240 may change the application execution screen in a streamable form, so as to share the application execution screen with the device 100 in real time.

After step S360, the processor 240 may stream and transmit the execution screen of the application (S370). Specifically, the processor 240 may provide substantially the same UX as the device 100 or the application installed in the device 100. That is, the processor 240 may provide the device 100 with substantially the same screen as the application installed in the device 100. So that, the user cannot recognize that the security service is currently being used.

To this end, the processor 240 may acquire the output data of the application. Or the processor 240 may acquire the output data of the device 100 from the device 100. Here, the output data may include various types of output data which can be visually and acoustically confirmed, such as resolution, font setting, page zoom in/out setting, language setting, tap setting, and screen rotation setting of the device 100 or the application.

The processor 240 may apply the acquired output data to the execution screen of the application to be driven in the virtual machine. For example, the processor 240 may change the font and the resolution of the execution screen of the application.

Meanwhile, the processor 240 may include an activation release request of the security service on the execution screen of the application transmitted via streaming.

Referring to FIG. 10, the device 100 may be provided with an instruction window 109 for indicating that a security service is being provided in one area the application screen. In addition, a button 110 for canceling the activation of the security service may be provided in one area of the same application screen.

According to the exemplary embodiment, the instruction window 109 may be hidden in an area of the screen so that the user cannot recognize that the application is being executed in the security service providing server 200.

When receiving the activation release request of the security service through the communication interface 210, the processor 240 may terminate the remote application. In addition, the processor 240 may transmit an application execution request through the application link to the application or the default browser installed in the device 100.

Referring back to FIG. 9, the device 100 may stream (output) the execution screen of the application transmitted by the security service providing server 200 in real time (S380).

While the execution screen of the application is shared, the device 100 may acquire user operation data in the web page screen and transmit the acquired user operation data to the security service providing server 200 (S390). That is, the user may search a current application execution screen or a new application execution screen while maintaining the execution state of the application through the security service providing server 200 other than the device 100. The processor 240 may confirm the application execution screen searching process of the user through the user operation data.

Specifically, the processor 240 may acquire input data of the user through the application execution screen. Or the processor 240 may acquire motion data of the device 100. For example, the processor 240 may acquire touch data in one area in the web page screen, data selected according to touch, zoom in/out input data, text data input for search, etc. through the communication interface 210. For another example, the security processor 240 may acquire motion data in which the device 100 is changed from vertically to horizontally through the communication interface 210.

On the other hand, the text data may be acquired through an input device installed in the device 100. For example, the key input data may be acquired through a virtual keyboard displayed on the touch screen 143 of the device 100. Or the key input data may be acquired through other input/control devices (keyboard) 144 connected to the device 100.

The processor 240 may detect a position of a virtual input window on the application execution screen transmitted to the device 100. Specifically, the processor 240 may detect an INPUT area capable of displaying texts on an application execution screen (image). And the processor 240 may specify the INPUT area as a position of the virtual input window.

Thereafter, the processor 240 may receive a text acquired in the device 100 and input to the position of the virtual input window. In the process of rendering the application execution screen, the processor 240 may generate an input object including the received text. And then, the processor 240 may stream and transmit the generated input object to a position of the virtual input window.

That is, the processor 240 may image the text acquired from the device 100 as it is without requiring a text input device suitable for a type of text (e.g., Korean, English, Chinese, and Russian, etc.) to be input by the user.

After step S390, the processor 240 may process an application execution screen according to the acquisition of the user operation data (input data/motion data) (S400). Specifically, the processor 240 may acquire the input data/motion data of the user in the application driven in the virtual machine, thereby processing the execution screen of the remote application. For example, the processor 240 may move to a new application execution screen. Or the processor 240 may change the application execution screen according to the output data.

After step S400, the processor 240 may monitor the corresponding screen, before transmitting the application execution screen to the device 100 through the communication interface 210 (S410). The security service providing server 200 may determine the risk of a new application execution screen in the same manner as in step S340 when moving to the new application execution screen (S420). In addition, the processor 240 may delete the application execution screen as it is or partially according to the determined risk. And then, the processor 240 may transmit the deleted application execution screen to the device 100. In the same manner as in step S370, the processor 240 may render the application execution screen to be processed and stream and transmit the rendered application execution screen to the device 100.

Through steps S380 to S420, the user may review the risk of the application execution screen to be newly moved while maintaining the state connected to the application link through the security service providing server 200 other than the device 100.

After step S420, the device 100 may release or terminate the activation of the security service according to the user's selection (S430). For example, when the device 100 acquires input data corresponding to "remote release", the device 100 may provide the acquired input data to the security service providing server 200. Accordingly, the processor 240 may terminate the application. And the processor 240 may transmit an application execution request to the application installed in the device 100 or another browser through the application link. As another example, when the device 100 acquires input data corresponding to "termination", the device 100 may terminate the connection with the security service providing server 200.

The security service providing server 200 according to an exemplary embodiment of the present disclosure and the method of providing the security service using the same have been described above. According to the present disclosure, since the security service providing server 200 executes a URL in an isolated browser, renders the executed screen or compresses the executed application. And then, the security service providing server 200 streams the rendered screen or the compressed application to the device 100. It is possible to protect user's personal information and assets from malicious web pages and applications included in the corresponding URL.

Although the exemplary embodiments of the present disclosure have been described in detail with reference to the accompanying drawings, the present disclosure is not limited thereto and may be variously modified without departing from the technical concept of the present disclosure. Therefore, the exemplary embodiments disclosed in the present disclosure are intended not to limit the technical spirit of the present disclosure but to describe the present disclosure and the scope of the technical spirit of the present disclosure is not limited by these exemplary embodiments. Therefore, it should be understood that the above-described exemplary embodiments are illustrative in all aspects and do not limit the present disclosure. The protective scope of the present disclosure should be construed based on the appended claims, and all the technical spirits in the equivalent scope thereof should be construed as falling within the scope of the present disclosure.

What is claimed is:

1. A method of providing a security service, the method comprising:
 receiving identification data capable of calling an application from a device of a user;
 connecting to a web page of an application link corresponding to the identification data through a remote browser, by arbitrarily inputting user data as input data to an application to be executed in the remote browser if the application link is an application execution link;
 confirming
  whether a domain or path name included in the application link is registered in a security list or a blocking list, and
  whether the connected web page or the application automatically attempts to access the device;
 determining a risk of the connected web page based on a result of the confirming;
 determining access authority of the application according to the determined risk;
 rendering an execution screen of the application according to the determined access authority; and
 streaming and transmitting the execution screen of the application to provide a user experience (UX) that is substantially the same as the device or the application installed in the device,
 the method further comprising:
  acquiring output data from the device and the browser installed in the device, the output data including audiovisual and tactile output data,
  applying, before the rendering, the acquired output data on the web page screen to be processed in the remote browser, and
  processing the webpage screen according to the audiovisual output data and the tactile output data of the output data when user operation data is acquired from the device while maintaining a link-connected state,
 wherein the streaming and transmitting provides the user experience as if a series of processes are being performed in the device, the series of processes including a webpage screen processed using the audiovisual output data of the output data and a webpage screen processed using the tactile output data of the output data, and
 wherein the access authority of the application is determined depending on a risk level of the executed application, by
  blocking access authority to functions that can store data in a memory of the device of the user and to functions that can expose a user identification (ID) in the execution screen of the application, and
  allowing access to functions that are not linked to user information.

2. The method according to claim 1, wherein the identification data includes a package ID for the application or an installation link for the application.

3. The method according to claim 1, wherein the determining of the access authority of the application includes permitting the access authority of the user in the application executed through the web page when the domain or path name is registered in the security list.

4. The method according to claim 1, wherein the determining of the access authority of the application includes blocking at least partially the access authority of the user in the application executed through the web page when the domain or path name is registered in the blocking list.

5. The method according to claim 1, wherein the streaming and transmitting includes including an activation release request of the security service in the execution screen of the application according to the determined risk.

6. A security service providing server comprising:
 a communication interface;
 a memory; and
 a processor operatively coupled with the communication interface and the memory,
 wherein the processor is configured to
  receive identification data capable of calling an application from a device of a user,
  connect to a web page of an application link corresponding to the identification data through a remote browser, by arbitrarily inputting user data as input data to an application to be executed in the remote browser if the application link is an application execution link,
 confirm
  whether a domain or path name included in the application link is registered in a security list or a blocking list, and
  whether the connected web page or the application automatically attempts to access the device,
 determine a risk of the connected web page based on a result of the confirming;
 determine access authority of the application according to the determined risk,
 render an execution screen of the application according to the determined access authority, and
 stream and transmit the execution screen of the application to provide a user experience (UX) that is substantially the same as the device or the application installed in the device,
 wherein the processor is further configured to
  acquire output data from the device and the browser installed in the device, the output data including audiovisual and tactile output data,
  apply, before the rendering, the acquired output data on the web page screen to be processed in the remote browser, and process the webpage screen according to the audiovisual output data and the tactile output data of the output data when user operation data is acquired from the device while maintaining a link-connected state, wherein the user experience is provided as if a series of processes are being performed in the device, the series of processes including a webpage screen processed using the audiovisual output data of the output data and a webpage screen processed using the tactile output data of the output data, and wherein the access authority of the application is determined depending on a risk level of the executed application, by blocking access authority to functions that can store data in a memory of the device of the user and to functions that can expose a user identification (ID) in the execution screen of the application, and allowing access to functions that are not linked to user information.

* * * * *